United States Patent
Lee et al.

(10) Patent No.: US 8,249,997 B2
(45) Date of Patent: Aug. 21, 2012

(54) METHOD AND SYSTEM FOR INTEGRATED PALLET AND SORT SCHEME MAINTENANCE

(75) Inventors: Raymond Lee, Palatine, IL (US); Brian Bowers, Mundelein, IL (US); Paul Kostyniuk, Wilmette, IL (US)

(73) Assignee: Bell and Howell, LLC, Durham, NC (US)

( * ) Notice: Subject to any disclaimer, the term of this patent is extended or adjusted under 35 U.S.C. 154(b) by 545 days.

(21) Appl. No.: 12/467,893

(22) Filed: May 18, 2009

(65) Prior Publication Data

US 2009/0319324 A1 Dec. 24, 2009

Related U.S. Application Data

(60) Provisional application No. 61/053,979, filed on May 16, 2008.

(51) Int. Cl.
*G06Q 30/00* (2012.01)
*G06F 7/00* (2006.01)
(52) U.S. Cl. .................... 705/332; 700/217
(58) Field of Classification Search .......... 705/332; 700/217
See application file for complete search history.

(56) References Cited

U.S. PATENT DOCUMENTS

| | | | | |
|---|---|---|---|---|
| 2002/0069186 A1* | 6/2002 | Moore | | 705/401 |
| 2002/0144021 A1* | 10/2002 | Pigos et al. | | 709/330 |
| 2003/0086115 A1* | 5/2003 | Bhatti | | 358/1.15 |
| 2003/0191667 A1* | 10/2003 | Fitzgerald et al. | | 705/2 |
| 2006/0108266 A1* | 5/2006 | Bowers et al. | | 209/584 |
| 2006/0271234 A1* | 11/2006 | Gaug et al. | | 700/213 |

* cited by examiner

*Primary Examiner* — Kevin Flynn
(74) *Attorney, Agent, or Firm* — McDermott Will & Emery LLP

(57) ABSTRACT

A computer coupled to a mail processing device enables sort schemes having associated sort parameters, particularly mail item sort schemes and an associated pallet scheme providing pallet location designations for mail items sorted in accord with one or more of the sort schemes. A mailing job to be run by the mail processing device as well as an execution or dispatch date of the mailing job are selected or otherwise identified. Based on mailing criteria corresponding to the mailing job, a server or other computer associated within the mail processing device retrieves a pallet scheme and a one or more mail sort schemes. One or more pallet location designations associated with the sort scheme(s) are updated, based on the pallet scheme. The mail processing device is run on the mailing job, based on said one or more enabled sort schemes.

8 Claims, 6 Drawing Sheets

FIG. 4

Add/Edit Pallet Scheme

| Field | Value | | Field | Value |
|---|---|---|---|---|
| Dispatch Time | 0 : 0 | | Arrival Time | 0 : 0 |
| Days of week* | Select Day Of Week / Monday / Tuesday / Wednesday / Thursday | | Trip Number | |
| Recurring Appointment Seq.ID | | | Critical Acceptance Time (CAT) | 0 : 0 |
| Facility Locale Key | | | Pallet Position | |
| Processing Category* | FLATS | | Processing Code* | Surface |
| Processing Code Label | | | Minimum Load For Containers | |
| Container Ready Time | 0 : 0 | | Seperation Number | 2 |
| Label To* | Orlando | | Label ZIP Code* | 60090 |
| Container Dest. ZIP* | 888-900 | | | |
| Note | | | | |

[Save]  [Cancel]

METHOD AND SYSTEM FOR INTEGRATED PALLET AND SORT SCHEME MAINTENANCE

RELATED APPLICATIONS

This application claims the benefit of U.S. Provisional Application No. 61/053,979, filed on May 16, 2008 entitled "Delayed Binding for Pallet Scheme Maintenance," the disclosure of which also is entirely incorporated herein by reference.

TECHNICAL FIELD

The subject matter discussed herein relates to a method, a system and a program product, for pallet scheme creation and maintenance within a multi-device mail processing environment, particularly where the mail processing environment also implements a mail sortation scheme.

BACKGROUND

A mailing job defines the various rules, requirements and constraints associated with the processing of a plurality of mail items, the owners of said mail items and the human and machine resources necessary to process the mail items within a given mail processing environment. When the mail processing environment is a presort bureau or other sort processing facility, it is common to employ one or more sorters to facilitate execution of the mailing job. This is especially true in cases where the mailing job features large volumes of mail items requiring sorting in accord with postal authority rules or the like. Sort schemes are executable instructions operable by the one or more sorters that define how they are to respond to a mail item (e.g. mark it or sort it) during processing of a mailing job, such as with respect to particular postal authority rules. In concert with the sort schemes, a pallet scheme defines how and where mail trays containing a group of commonly sorted mail items of a mailing job are to be staged and loaded onto pallets for shipment to the postal authority.

Maintenance of sort schemes and pallet schemes is of utmost importance for ensuring that a mailing job is processed in accord with the latest and greatest postal regulations. Failure to do so results in improperly sorted or palletized mail items, which in the case of the United States Postal Authority, creates numerous mail fines. Typically, pallet scheme maintenance is driven by a customer service agreement between the mailer of a mailing job (or agent thereof) and the postal authority. The agreement defines, amongst other things, the designated pickup times and locations within the sort processing facility of pallets containing mail trays having specific zip schemes. A pallet scheme maintenance tool is typically used within the sort processing facility for processing mail trays in accord with the agreement. Sort scheme maintenance, on the other hand, may be driven by adaptations to zip code designations per the postal authority or by internal mailing criteria changes ,such as changes to mailing job parameters. If a pallet scheme is created or changed independently from its associated sort scheme or vice versa, incompatibility between the schemes can cause operation delay or may necessitate a re-run of the mail processing job, which is even worse.

Today's sort scheme or pallet scheme maintenance tools require manual association or linking of a particular sort scheme and/or pallet scheme at the time of edition or creation. So, for example, when selecting one or more sort schemes to run for processing a particular mailing job on one or more sorters, a pallet scheme for indicating where the schemed mail trays are to be physically located and loaded onto pallets for pickup must also be manually selected at this time. Of course, when changes to the pallet scheme per postal authority rules occur, a tedious process of reassigning the pallet location designations respective to the sort schemes must be undertaken. This results in the sorter operator manually adapting every sort bin assignment within a sort scheme (there may be several sort schemes) relative to the pallet scheme change.

Hence, a need exists for improved sort scheme and pallet scheme maintenance procedures that enable dynamic association and updating of schemes relative to postal authority rule changes, for example, on an automated basis.

SUMMARY

The present disclosure generally describes a system, software and one or more methods for validating mail items or mail trays within a mail processing system.

For example, the detailed description provides a method for performing a mailing job within a mail processing environment, for example, on a mail processing device within the processing environment. The method involves selecting or otherwise identifying a mailing job to be run by the mail processing device as well as a date that the mailing job is to be executed and/or dispatched. Then, based on mailing criteria corresponding to the mailing job, a server or other computer associated with the mail processing device retrieves a pallet scheme and a one or more mail sort schemes. The pallet scheme provides pallet location designations, and the pallet scheme has an assigned effective date corresponding most closely to the date the mailing job is to be executed and/or dispatched. The retrieved mail sort scheme(s) also has an assigned effective date, corresponding most closely to the date the mailing job is to be executed and/or dispatched. The method also involves updating a pallet location designation associated with the one or more sort schemes as retrieved, based on the retrieved pallet scheme. One or more of the sort schemes are enabled based on the mailing job to be processed, e.g. so that the mail processing device can be run on the mailing job, based on the enabled sort scheme(s).

Those skilled in the art will recognize that the techniques outlined above will often be implemented using programmed computers, for example, as may be implemented in association with or controlling an appropriate sorting system or other mail processing device, in the mail processing environment. Hence, the methodology may be embodied in appropriate programmed computer systems or in software products for programming one or more such systems.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 2 depicts an exemplary sorting operations template for enabling the processing of a mailing job within the sort processing environment of FIG. 1 respective to established pallet and sort scheme settings.

FIG. 3 is an exemplary tag for affixation to a mail tray for indicating an associated pallet location designation with the mail processing environment of FIG. 1.

FIG. 4 is and exemplary graphical user interface for accessing a sorter operations template.

DETAILED DESCRIPTION

Figure 1:
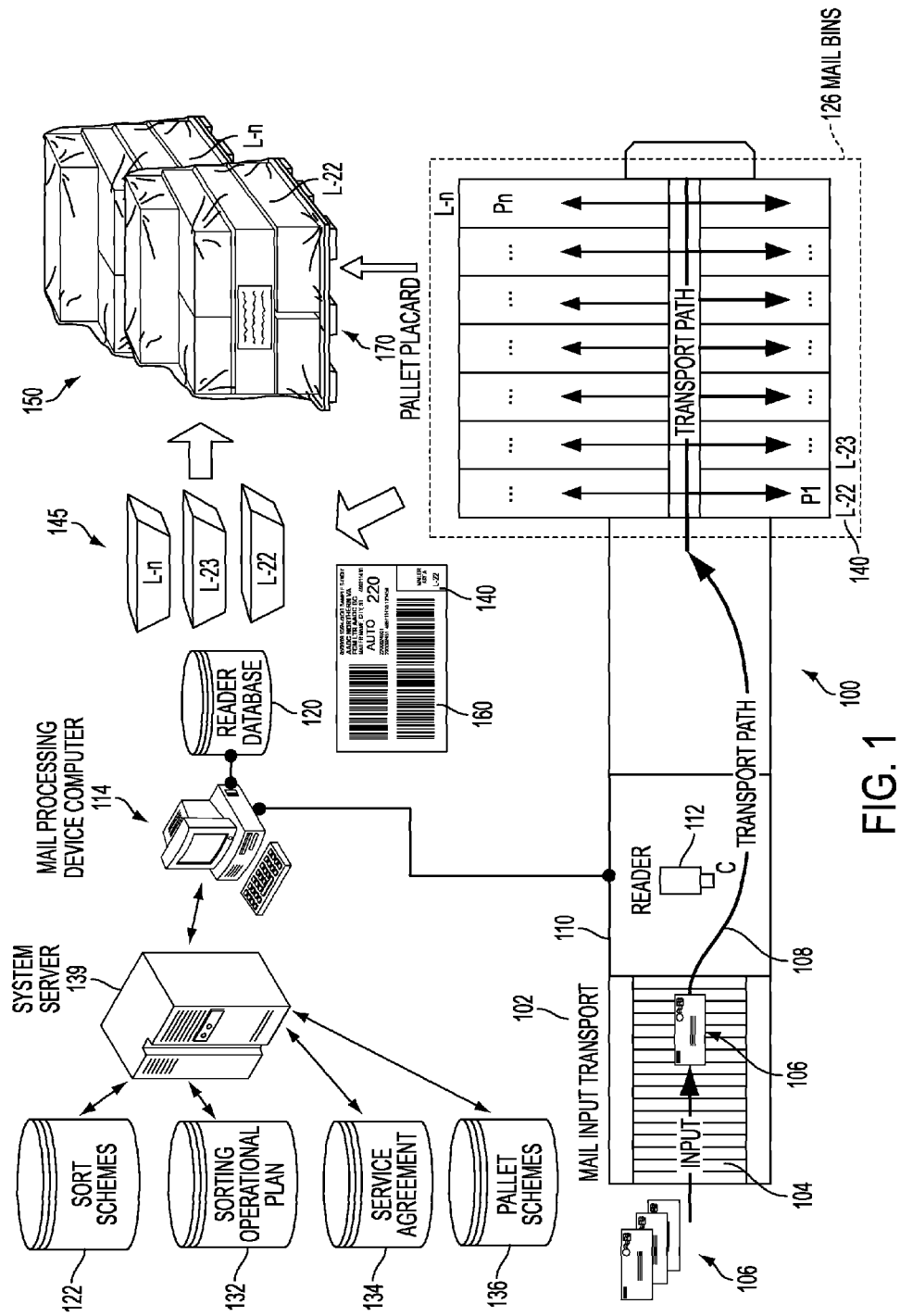
FIG. 1 depicts an exemplary sort processing environment for enabling the sortation of mail items.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

As used herein, the term "mail piece" or "mail item" refers to any document having human or machine readable content generated thereon, and particularly that intended for delivery to a given recipient. In the context of a general mailing facility, this may include envelopes, newsletters, newspapers, magazines, post cards, parcels or packages of varying thicknesses (e.g., flat mail), coupon booklets, brochures, and any other like documents. Such documents may or may not be generated for the purpose of being distributed via an outgoing distribution channel (e.g., delivery company, postal authority), but rather, may be generated for direct/personal carry, delivery or internal distribution. When a plurality of such mail items as described above are grouped together (e.g., associated with one another according to a common characteristic or mail item processing rule), this is referred to as a "mail grouping." Groupings may include a plurality of mail items having a common ZIP code or range thereof, common internal destination point, common physical characteristics, or common rules, limitations or special instructions as defined in accord with a sort scheme. In the context of a sort scheme, which comprises one or more instructions that dictate how a sort processing system is to handle mail items during processing, the common parameters as mentioned above are referred to as "sort parameters."

Also as used herein, the phrase document or mail processing system refers to any high speed transport device(s) capable of processing documents at considerably high rates with considerably high precision. Document processing systems may include, but are not limited to, inbound sorting equipment, outbound mail sorting equipment and even various forms of inserter machines, mail integrity systems or the like for office, commercial or industrial settings. A "mail bin" or "pocket" as used in connection with a document processing system may refer to any device for receiving, accumulating and/or collecting processed mail items. While the foregoing discussion will present the teachings in an exemplary fashion with respect to a conventional sorter device and environment, it will be apparent to those skilled in the art that the teachings may apply to any type of document processing device or system (e.g., inserter, accumulator, etc.) desiring or requiring operational instruction or scheme generation and maintenance capability.

With this in mind, those skilled in the art will appreciate that the exemplary teachings described herein enable sort schemes having associated sort parameters, particularly mail piece sort schemes and associated palletization schemes, to be adapted and/or linked dynamically.

Turning attention to FIG. 1, a mail processing system is shown in the form of a high speed sorter device 100 adapted to process mail items. A stream of addressed mail 106 can be received as input to the sorter device, where each mail item may have one or more markings and/or delivery point identifiers thereon. For example, a type of delivery point identifier may include a ZIP code that is capable of being identified by a reader device 112. The delivery point identifier may be one type of sort parameter by which to process each mail item in accord with a sort scheme by the mail processing device computer 114 into one or more mail pockets or bins P1-Pn 126. In addition to ZIP codes, other delivery point identifiers may include the recipient's name or entity name, street name, P.O. Box number, building name, barcode, postage or indicia, etc. As will be discussed subsequently, each mail bin P1-Pn may also be assigned to or associated with a specific pallet location designation, L-22 to L-n in this example, in accord with a pallet scheme.

The mail processing system 100 may include a mail input transport component 102, including a grooved belt drive or conveyor belt system 104 for transporting a mail item 106 and aligning it properly with a transport path 108 of the sorter. The transport path 108 defines the general direction that an incoming mail piece is guided along during its processing by the mail processing system 100. Coupled to the mail input transport component 102 is an image scanning or reader device 112, equipped with an imaging device such as an optical scanner or camera. The reader device 112 scans or images a mail item 106 to extrapolate the various physical characteristics of the mail item (e.g., height, weight), or at least the one or more delivery point identifiers on the mail piece as it is processed by the mail processing system 100 along the transport path 108. Typically, the reader device 112 is placed upstream along the transport path 108 so that the address components can be scanned early on in the processing phase and subsequently recognized or tracked against recognized data records using optical character recognition technology (OCR). Typical OCR systems include the optical scanner or reader 112 for reading text, and sophisticated software for analyzing images and features of the mail item. Alternatively, the OCR system may include a combination of hardware (e.g., specialized circuit boards) and software to recognize characters, or can be executed entirely through software. Those skilled in the art will recognize that various OCR systems may be employed by the reader device 112 for the purpose of interpreting or determining the physical characteristics of a mail item.

The reader device 112 may be controlled by the mail processing device computer 114, which as described above, may or may not execute the OCR utility. Accessible by or resident upon the mail processing device computer 114 is a reader database 120, which contains data records of the plurality of recognized delivery point identifiers, markings and other data that may exist on a mail item. The reader database 120 can be customized from one enterprise to the next to include an enterprise's or generally accepted postal authority based commonly known address components, unique identifiers and other markings potentially useable as sort parameters. Furthermore, when a mail item is imaged and OCR technology is used for interpreting the markings thereon, said markings may be compared to the data records within the reader database 120 to identify if the marking matches known data.

In communication (optionally) with the mail processing device computer 114 is a system server 139, through which the mail processing device computer 138 may communicate with other sorters within the same or a different mail processing facility. The mail processing device computer may also communicate with the server system 139 in order to access various databases for enabling sort operations. For example, the mail processing device computer 114 may access a sort scheme database 122, wherein the various operational instructions used to affect the sorter's processing of mail items respective to the delivery point identifiers, markings and data they convey as detected by the reader 112 may be stored. Hence, the reader 112 may enable the detection of one or more sort parameters by which a particular scheme maintained within the database 122 may be employed.

A sorter operational plan database 132 may also be accessed to enable operation of the sorter 100 with respect to the unique conditions, considerations and work processing needs of the mail processing environment. Data accessible from database 132 may include, but is not limited to, machine availability and status information, bin capacity data per machine, operator availability and status information, mailing job scheduling and job sequencing data, historical data respective to known clients, mail items or mailing jobs to be processed (e.g., typical mail item volumes on a given day of the week), client profile and requirements data, postal requirements data, etc. In the context of a subsequent processing arrangement, wherein multiple independent mail processing facilities exchange mail items to drive work sharing discounts, sorting operations plan data pertaining to the arrangement may also be maintained. Sort schemes 122 may be executed by a given sorter within the mail processing environment with respect to the sorter operational plan data 132.

The mail processing device computer 114 may also access a pallet scheme database 136 via the server 139. Pallet scheme data 136 is that indicative of how and where mail trays 145 containing a group of commonly sorted mail items as swept from sort bins P1-Pn are to be staged and loaded onto pallets 150 into packages for shipment to the delivery carrier. Pallets 150 containing a plurality of mail trays 145 are typically picked up from the loading dock of a mail processing facility at specific times in accord with a customer service agreement 134 between the delivery carrier (e.g., United States Postal Service (USPS)) and the mail processing facility. Data may include, but is not limited to, the specific lanes or zone locations for a pallet to be picked up along with the corresponding mail tray ZIP code groupings or associated schemes to be assigned to said pallet. Hence, as only a limited number of ZIP groupings may be assigned to a pallet—i.e., in accord with a USPS pallet scheme—it is equally necessary that mail trays be populated with only those mail items required by the scheme. In this relationship, those skilled in the art are well aware of the interdependency between the sort schemes required to populate the mail trays 145 and the pallet schemes required to dictate which trays 145 get packaged together at a designated pallet 150 location for carrier delivery.

To facilitate correct placement of mail trays to a pallet, each mail tray 145 is assigned/affixed with a tray tag 160, which may include various data printed thereon as depicted in FIG. 3. Data printed on a tray tag 160 may include, but is not limited to, one or more barcodes 330 and 332 (i.e., Intelligent Mail Tray Barcodes), mailer name, address data and other information pertaining to the type of mail trays 334 contained within the pallet 150. The tray tag 160 may also feature a print region known as a mailer area 336, wherein only data of special interest to the mailer such as a pallet location designation 140 may be printed. A pallet location designation 140 is printed on the tray tag 160 based on pallet scheme information 136 to facilitate delivery of a complete mail tray to the proper pallet location (lane, zone, region, etc.). As a final step in the process of completing a mailing job and building pallets 150 into complete tray group packages ready for delivery, each package is further assigned/affixed with a pallet placard 170 featuring printed data such as barcodes or data indicative of the mailer or mail trays.

While not shown expressly in the figure, various other processing devices can be placed along the transport path 108 for processing mail items and/or detecting mail item characteristics. For example, an inline scale, thickness detector, magnetic sensor and various other measurement or detection devices may be employed. Also, while mention has been made of the various databases available to the mail processing device computer 114 for enabling sort operations, those skilled in the art will recognize that the databases may be internally or externally located from the facility housing the mail processing system 100.

Turning now to FIG. 2, an exemplary sorting operations template 305 for enabling the processing of a mailing job within a sort processing environment is depicted. In particular, the sorting template is presented for execution by the mail processing device computer 114 and/or the server system 139 for coordinating the overall sorter operational plan required for execution of a particular mailing job. A mailing job may be seen as, but is not limited to, one or more clients, machine resources, mail items and tasks to be executed to fulfill desired mail processing results. So, for instance, if a mail processing facility is provided a plurality of mail items by a particular client, the mailing job may require sort processing and postage application of said items for achieving maximum postage discounts for the client, facilitation of mail item delivery for the client, address quality verification services for the items, barcode application, postal authority documentation creation, data services and other processing tasks all requiring varying degrees of machine resources and requirements to be fulfilled. With this in mind, the sorter operations template 305 may be seen as a constructive framework and/or implemented as a data structure that includes the importation of, extraction of, (functional) calling of or access to required data from the plurality of databases of FIG. 1 as required to complete a mailing job. The sorting operations template may be implemented as software accessible to a user (e.g., operator or facilities manager) from a graphical user interface, via data/file control means, etc.

So, for example, consider a particular sort processing environment run by MAIL PROCESSING COMPANY A. MAIL PROCESSING COMPANY A, when presented with a mailing job to be executed on behalf of a particular client, may rely on mailing criteria data 318 (e.g., as maintained in the sorter operational plan database 132) in order to define a practical approach to job execution. Mailing criteria may include, but is not limited to any historical, trend, situational or transactional data pertaining to the mailing job or the client in question in light of the job requirements. In the example, mailing criteria 318 for a mailing job of a client that primarily consists of mail to be directed to east coast ZIP designations may be defined as mailing criteria EAST 320. Mailing criteria EAST 320 may include historical mail volume data, expected ZIP code designations, sorter requirements data, typical processing time, client requirements, etc. Based on the criteria, various sort schemes 130 A-D may also be associated with the mailing job for execution by the required sort processing devices to process the east coast based mail items. Those skilled in the art will appreciate that the mailing criteria may be created, refined and customized accordingly to accommodate mailing job requirements in the context of the overall sorter operational plan The sorting operations template 305 for MAIL PROCESSING FACILITY A may also describe a plurality of pallet schemes 136, all of which are executed in light of a service agreement 134. In the example, MAIL PROCESSING COMPANY A has several pallet schemes available, namely east, local, west and other for accommodating differing mail types or requirements. In the case of a mailing job primarily consisting of mail items having east coast based ZIP designations, pallet scheme PS-EAST 316 is of particular relevance; pertinent to postal authority ZIP schemes associated with east coast jurisdictions. As dictated by the mailing criteria, other sort schemes and/or pallet schemes may be associated with other mailing job requirements, such as a local pallet scheme and corresponding sort schemes M and N for processing of a mailing to be locally delivered. Generally speaking, it will be recognized by those skilled in the art that the mailing criteria presents a basic framework or routine (in data) from which to process (physically) a particular mailing job based on its unique characteristics and requirements.

Of further relevance to the exemplary sorting operations template 305 is the effective date 326 associated with the each of the pallet schemes 136 and sort schemes 130. Each of the sort schemes and pallet schemes are saved to their respective databases 130 and 136 with an effective date assigned, the date pertaining to or indicative of the future applicability and/or most current relevance of the scheme instructions contained within. As such, there may be multiple instances of a particular scheme within a given database, enabling differing versions of said scheme to be selected for execution as part of a sorting operations template 305. For example, let's assume that on a date of execution of a mailing job May 10, 2009, A 324 as required to complete a mailing job based on determined mailing criteria 320 are available in the database. In a first instance, the associated effective date of the sort scheme 324 is Apr. 10, 2009, indicating that the scheme at least accounts for the most current postal regulations and/or mailing criteria as of the date of mailing job execution May 10, 2009. In a second instance of sort scheme 324, the effective date is Jun. 10, 2009, indicating that the scheme accounts for future postal regulations and/or mailing criteria as of the date of mailing job execution May 10, 2009. With these different instances in mind, if the mailing job is to be dispatched to a delivery carrier on May 10, 2009 (the date of mailing job execution), the sorting operations template 305 will require and call for the first instance of the sort scheme 324 with effective date Apr. 10, 2009; the date less than or equal to the date of intended mail dispatch so that the most up-to-date scheme rules and assumptions may be applied.

If on the other hand a mailing job is to be dispatched at a future date of say Jun. 14, 2009, the sorting operations template 305 will require and call for the second instance of the sort scheme 324 with effective date Jun. 10, 2009; the date greater than the date of mailing job execution so that the most relevant scheme rules and assumptions of the time of dispatch may be applied. In this way, it is feasible to execute a mailing job on a date of May 10, 2009 that is not intended for dispatch to the delivery carrier until Jun. 14, 2009. Essentially, the effective date associated with a particular scheme relative to the mailing job execution date, be it a sort scheme or pallet scheme, may trigger access of a future or most up-to-date instance of the scheme to be associated with the sorting operations template 305. Skilled practitioners will recognize that this approach is of paramount importance, as the pallet schemes and sort schemes may be dynamically associated via the sorting operations template 305 based on the mailing criteria while also enabling the most relevant or applicable scheme instances to be applied to the mailing job. The effective date of the schemes may be compared against the designated mailing job execution date (or dispatch date) as designated by an operator or manager of the mail processing facility via access to the sorting operations template interface, to ensure accuracy.

Figure 5:
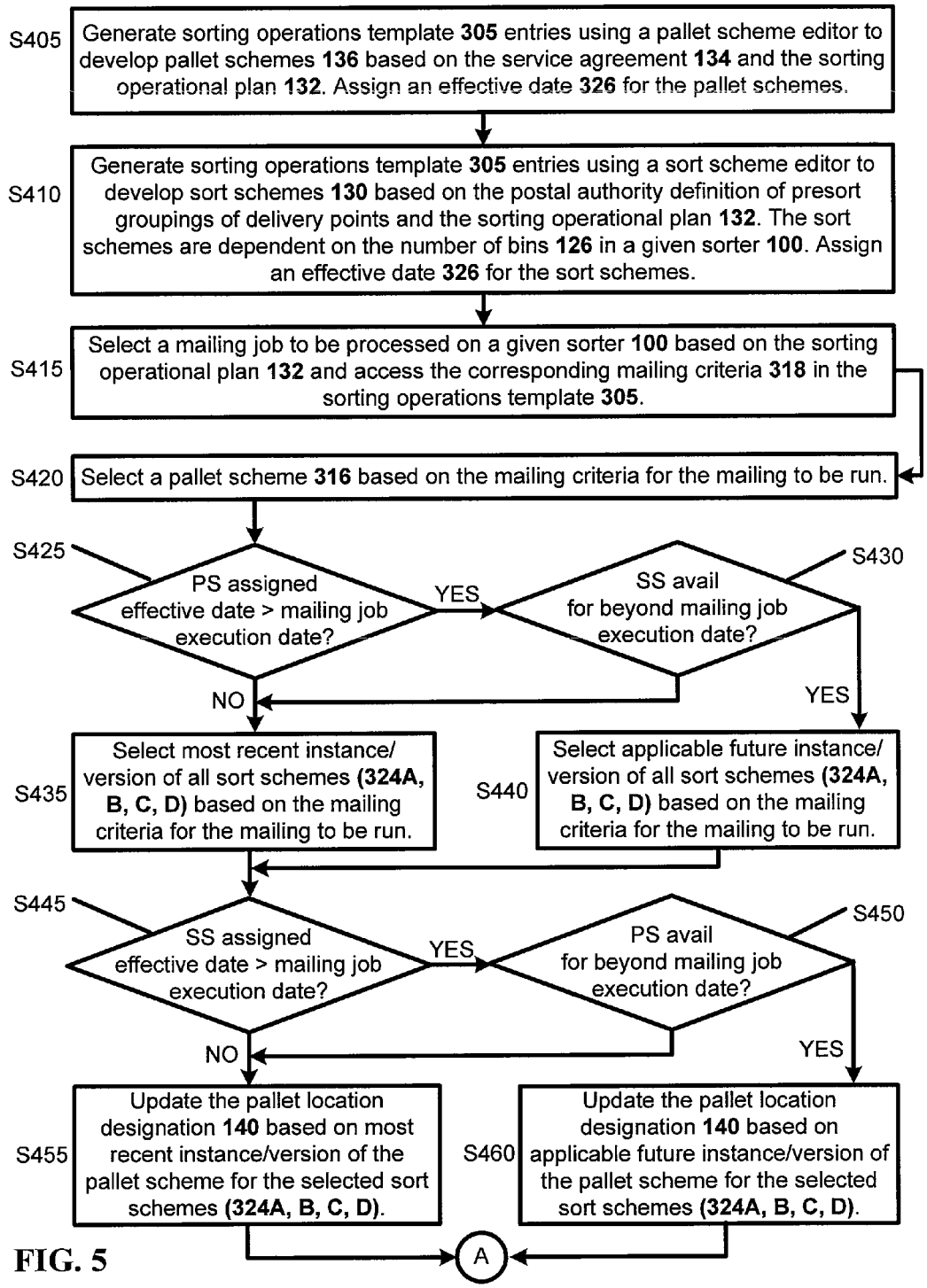
FIGS. 5-6 are exemplary flow charts depicting the process by which sort scheme and pallet schemes are dynamically assigned in association with the sorter operations template of FIG. 2.

An exemplary interface 400 for which a sorting operations template 305 may be established or accessed is shown in FIG. 4. This particular exemplary interface is representative of a pallet scheme editor, which may be accessed by the operator from the mail processing device computer 114 or other computing device having access to the server system 139. Of course, multiple other interface types may be used for establishing or accessing the sorting operations template 305 such as a sort scheme editor or sorting facility management screen. Regardless of the interface type, various data entry fields are presented, some of which may be populated by the user and others automatically populated on the basis of mailing criteria 318 or other parameters associated with the mailing job to be executed. As alluded to previously, for example, selecting the execution of a mailing job associated with the EAST mailing criteria 320 may automatically cause the selection, calling, importing, populating or retrieval of pallet scheme PS-EAST 316. Likewise, the associated sort schemes A-D are be retrieved. The process by which dynamic, integrated pallet scheme and sort scheme selection is performed in association with a sorter operations template 305 is presented in FIGS. 5-6.

As a first step, sorting operations template 305 entries may be generated using a pallet scheme editor (i.e., via a graphical user interface as in FIG. 4) to develop pallet schemes 136 based on the service agreement 134 between the mail processing facility and the postal authority, and also the sorting operational plan 132. An effective date 326 for the pallet schemes is also assigned by the operator or sort processing facility manager at this time (step 405). In instances where the actual date of mail dispatch is intended for a date other than the current mailing job execution date, the effective date may be assigned by the user to be the intended mail dispatch date. On the other hand, a user may assign the effective date to be that of the mailing job execution date in instances where this date also matches the intended date of mail dispatch.

As an alternative first step, sorting operations template 305 entries may be generated using a sort scheme editor to develop sort schemes 130 based on the postal authority definition of presort groupings of delivery points and the sorting operational plan 132. The sort schemes are dependent on the number of bins 126 in a given sorter 100 or other mailing criteria. An effective date 326 is then assigned at this time (step 406). In instances where the actual date of mail dispatch is intended for a date other than the current mailing job execution date, the effective date may be selected by the user to correspond to the intended mail dispatch date. On the other hand, a user may assign the effective date to be that of the mailing job execution date in instances where this date is also the intended date of mail dispatch. Steps 405 and 406 can be performed interchangeably as each process leads to the assignment or selection of the other.

Next, a mailing job to be processed is selected or loaded on a given sorter 100 from its associated mail processing device computer 114 based on the sorting operational plan data 132 as defined by the sorting operational template 305. The corresponding mailing criteria 318 in the sorting operations template 305 is also accessed with respect to the mailing job to be executed (step 415). These actions help prepare and ready the sorter, along with any manual adjustment of specific sorter settings, for execution of the mailing job via that particular sorter. To ensure the applicable or most up-to-date sort scheme is applied, once a pallet scheme 316 is selected or loaded based on the mailing criteria for the mailing job to be executed (step 420), the assigned effective date of the pallet scheme (i.e., date of intended mail dispatch) is compared against the mailing job execution date (i.e., the current date) (step 425). If the assigned effective date for the pallet scheme as entered by the user is greater than the mailing job execution date, the sort scheme database 130 is queried to identify if any applicable sort schemes are available beyond the mailing job execution date (step 430). When the conditions of steps 425 and 430 are not met, then the sorter operations template selects or loads the most recent instance or version of all associated sort schemes based on the mailing criteria for the mailing job (step 435). When the condition of step 430 is met, however, then the sorter operations template selects or loads the applicable future instance or version of all associated sort schemes based on the mailing criteria for the mailing job (step 440). For steps 435 or 440, the sort schemes are automatically selected or loaded to be the most consistent version in association with the pallet scheme in question.

To ensure the applicable or most up-to-date pallet scheme is applied, the assigned effective date of the sort scheme (i.e., date of intended mail dispatch) is compared against the mailing job execution date (i.e., the current date) (step 445). If the assigned effective date for the sort scheme as entered by the user is greater than the mailing job execution date, the pallet scheme database 130 is queried to identify if any applicable pallet schemes are available beyond the mailing job execution date (step 450). When the conditions of steps 445 and 450 are not met, then the sorter operations template selects or loads the most recent instance or version of the associated pallet scheme and updates the pallet location designation accordingly for the selected sort schemes (step 455). When the condition of step 450 is met, however, then the sorter operations template selects or loads the applicable future instance or version of the associated pallet scheme and updates the pallet location designation accordingly for the selected or loaded sort schemes (step 460). For steps 455 or 460, the pallet schemes are automatically selected or loaded to be the most consistent version in association with the sort schemes in question.

Figure 6:
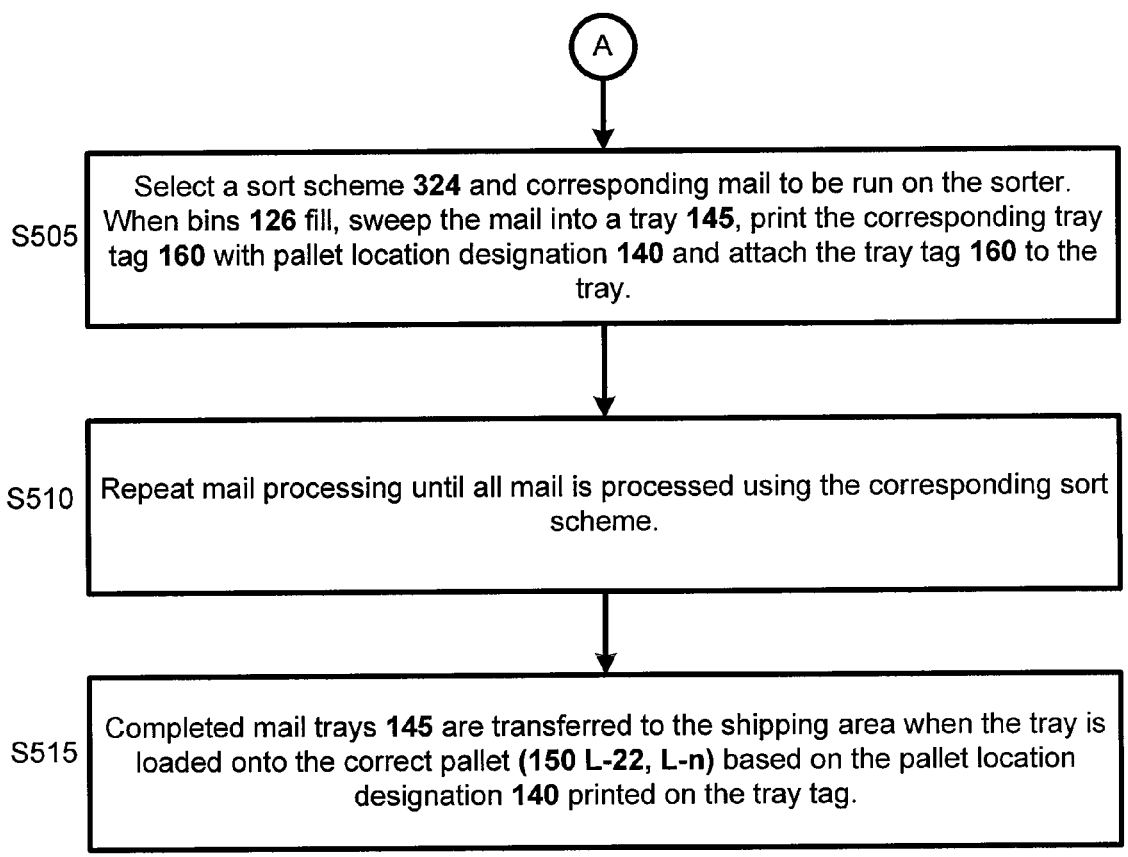

Having dynamically integrated the selection and association of a pallet scheme with one or more sort schemes via the sorting operations template 305 as presented in FIG. 4, the operator may load a sort scheme from to the appropriate sorter to begin actual execution of the mailing job by the appropriate sorter (FIG. 6). As the mail items associated with the mailing job are appropriately sorted to respective mail bins in accord with the sort scheme, they may be swept into mail trays. Mail tray tags may then be generated and affixed to the trays with the corresponding pallet location designation printed thereon (step 505). This process is repeated until all mail items are processed and mail trays are produced (step 510). Finally, the mail trays may be transported to the appropriate pallet locations as designated by the mail tray tags (step 515).

As shown by the above discussion, functions relating to the generation and maintenance of mail item sort schemes and an associated scheme for sorting trays to respective pallets may be implemented on computers connected for data communication via the components of a packet data network, operating as the mail processing system computers, such as those shown at 114 and/or 139 in FIG. 1. Although special purpose devices may be used, such devices also may be implemented using one or more hardware platforms intended to represent general classes of data processing device commonly used to run "client" and/or "server" programming so as to implement the functions discussed above, albeit with an appropriate network connection for data communication with each other and with the other elements of the mail processing system.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files used for the generation and maintenance of the various schemes. The software code is executable by the general-purpose computer that functions as the server 139 and/or that functions as the mail processing device computer 114. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for integrated pallet and sort scheme processing, in essentially the manner performed in the implementations discussed and illustrated herein.

Figure 7:
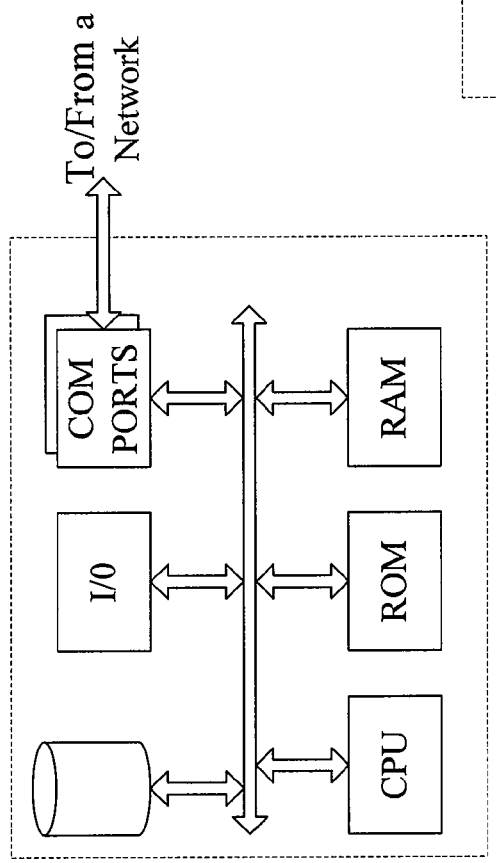
FIG. 7 illustrates a network or host computer platform, as may typically be used to implement a server.
Figure 8:
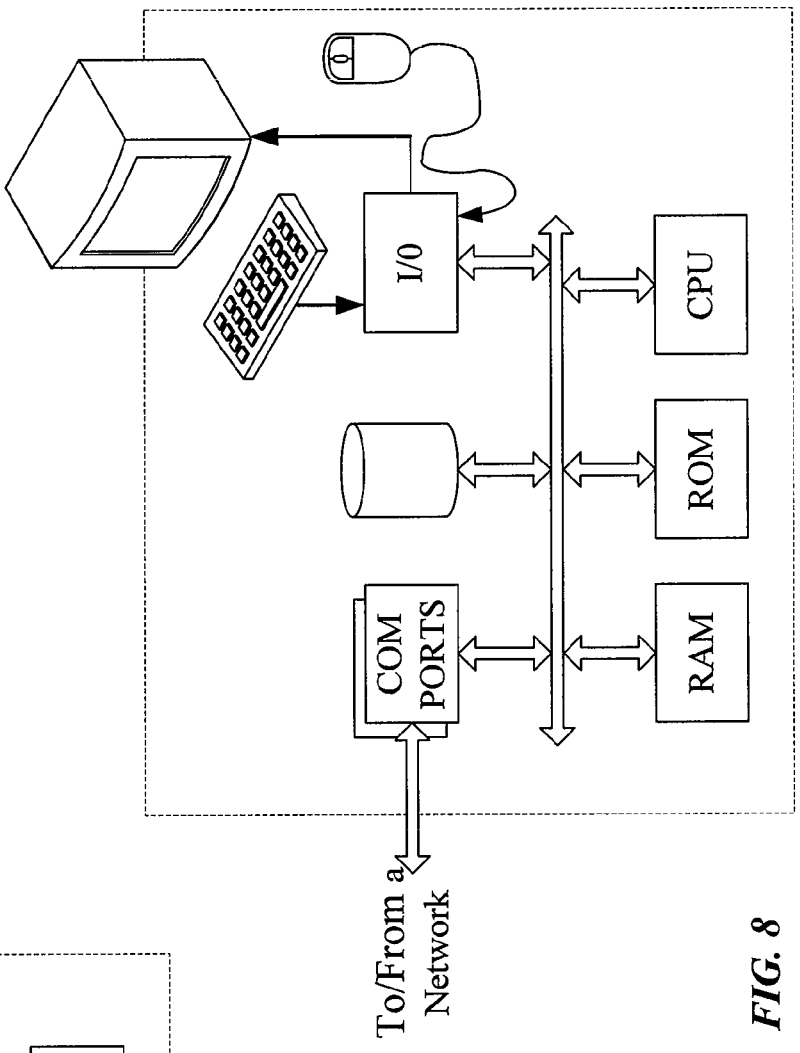
FIG. 8 depicts a computer with user interface elements.

FIGS. 7 and 8 provide functional block diagram illustrations of general purpose computer hardware platforms. FIG. 7 illustrates a network or host computer platform, as may typically be used to implement a server. FIG. 8 depicts a computer with user interface elements, as may be used to implement a personal computer (PC) or other type of work station or terminal device, although the computer of FIG. 8 may also act as a server if appropriately programmed. It is believed that those skilled in the art are familiar with the structure, programming and general operation of such computer equipment and, as a result, the drawings should be self-explanatory.

For example, control computer 114 may be a PC based implementation of a central control processing system like that of FIG. 8, or may be implemented on a platform configured as a central or host computer or server like that of FIG. 7. Such a system typically contains a central processing unit (CPU), memories and an interconnect bus. The CPU may contain a single microprocessor (e.g. a Pentium microprocessor), or it may contain a plurality of microprocessors for configuring the CPU as a multi-processor system. The memories include a main memory, such as a dynamic random access memory (DRAM) and cache, as well as a read only memory, such as a PROM, an EPROM, a FLASH-EPROM or the like. The system memories also include one or more mass storage devices such as various disk drives, tape drives, etc.

In operation, the main memory stores at least portions of instructions for execution by the CPU and data for processing in accord with the executed instructions, for example, as uploaded from mass storage. The mass storage may include one or more magnetic disk or tape drives or optical disk drives, for storing data and instructions for use by CPU. For example, at least one mass storage system in the form of a disk drive or tape drive, stores the operating system and various application software as well as data, such as sort scheme instructions and image data. The mass storage within the computer system may also include one or more drives for various portable media, such as a floppy disk, a compact disc read only memory (CD-ROM), or an integrated circuit non-volatile memory adapter (i.e. PC-MCIA adapter) to input and output data and code to and from the computer system.

The system also includes one or more input/output interfaces for communications, shown by way of example as an interface for data communications with one or more other processing systems, either within the mail processing environment or with other external devices/computers. Although not shown, one or more such interfaces may enable communications via a network, e.g., to enable sending and receiving instructions electronically. The physical communication links may be optical, wired, or wireless.

The computer system may further include appropriate input/output ports for interconnection with a display and a keyboard serving as the respective user interface for the processor/controller. For example, a printer control computer in a document factory may include a graphics subsystem to drive the output display. The output display, for example, may include a cathode ray tube (CRT) display, or a liquid crystal display (LCD) or other type of display device. The input control devices for such an implementation of the system would include the keyboard for inputting alphanumeric and other key information. The input control devices for the system may further include a cursor control device (not shown), such as a mouse, a touchpad, a trackball, stylus, or cursor direction keys. The links of the peripherals to the system may be wired connections or use wireless communications.

The computer system runs a variety of applications programs and stores data, enabling one or more interactions via the user interface provided, and/or over a network to implement the desired processing, in this case, including those steps for processing sort schemes and palletization schemes as discussed above.

The components contained in the computer system are those typically found in general purpose computer systems. Although summarized in the discussion above mainly as a PC type implementation, those skilled in the art will recognize that the class of applicable computer systems also encompasses systems used as host computers, servers, workstations, network terminals, and the like. In fact, these components are intended to represent a broad category of such computer components that are well known in the art. The present examples are not limited to any one network or computing infrastructure model—i.e., peer-to-peer, client server, distributed, etc.

Hence aspects of the techniques discussed herein encompass hardware and programmed equipment for controlling the relevant pallet and sort scheme processing as well as software programming, for controlling the relevant functions. A software or program product, which may be referred to as an "article of manufacture" may take the form of code or executable instructions for causing a computer or other programmable equipment to perform the relevant processing steps regarding schemes for sorting mail items and sorting trays of sorted mail to respective pallets, where the code or instructions are carried by or otherwise embodied in a medium readable by a computer or other machine. Instructions or code for implementing such operations may be in the form of computer instruction in any form (e.g., source code, object code, interpreted code, etc.) stored in or carried by any readable medium.

Such a program article or product therefore takes the form of executable code and/or associated data that is carried on or embodied in a type of machine readable medium. "Storage" type media include any or all of the memory of the computers, processors or the like, or associated modules thereof, such as various semiconductor memories, tape drives, disk drives and the like, which may provide storage at any time for the software programming. All or portions of the software may at times be communicated through the Internet or various other telecommunication networks. Such communications, for example, may enable loading of the relevant software from one computer or processor into another, for example, from a management server or host computer into the image processor and comparator. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the sorting control and attendant mail item tracking based on unique mail item identifier. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

It will be appreciated by those skilled in the art that the exemplary techniques presented herein simplify the scheme maintenance process through dynamic sort scheme to pallet scheme allocation, which further enhances compatibility between the schemes. Typically, the user of a pallet scheme editor, sort scheme editor or other utility useful for establishing or accessing a sorting operations template 305 has no need to specify pallet positions when building a sort scheme. The user can effectively choose any sort scheme, including dynamically generated subsequent-pass scheme, at the sorter while maintaining compatibility with the associated pallet scheme.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method for performing a mailing job within a mail processing environment, the method comprising steps of:
   selecting a mailing job to be run by a mail processing device within the mail processing environment based on at least one corresponding mailing criteria;
   selecting a date that the mailing job is to be executed and/or dispatched;
   based on the corresponding mailing criteria and the selected date, retrieving:
      (1) a pallet scheme providing pallet location designations, the pallet scheme having an assigned effective date corresponding most closely to the date the mailing job is to be executed and/or dispatched, and
      (2) one or more mail sort schemes having an assigned effective date, corresponding most closely to the date the mailing job is to be executed and/or dispatched;
   updating a pallet location designation associated with the one or more mail sort schemes as retrieved, based on the retrieved pallet scheme and the one or more retrieved mail sort schemes; and
   running the mail processing device on the mailing job, based on the one or more retrieved sort schemes.

2. The method of claim 1, further comprising steps of:
   generating a tray tag having printed thereon the updated pallet location designation; and
   affixing the tray tag as generated to a corresponding mail tray associated with the mailing job.

3. The method of claim 1, wherein the steps of selecting are performed from a graphical user interface available to an operator of the mail processing device.

4. The method of claim 1, wherein the mailing criteria includes one or more of a historical, trend, situational or transactional data pertaining to the mailing job or the client for which the mailing job is to be executed.

5. The method of claim 1, wherein the assigned effective date of the pallet scheme and/or the assigned effective date of the one or more sort schemes is greater than the date the mailing job is to be executed and/or dispatched.

6. The method of claim 1, wherein the assigned effective date of the pallet scheme and/or the assigned effective date of the one or more sort schemes precedes the date the mailing job is to be executed and/or dispatched.

7. A system for processing a mailing job within a mail processing environment, the system comprising:
   a mail processing device for processing mail items, the mail processing device having a plurality of sort bins for collecting mail items in accordance with a sort scheme and pallet location designations;
   a mail processing device computer for receiving/initializing a mailing job to be run by the mail processing device based on at least one corresponding mailing criteria;
   a server in communication with the a mail processing device computer, for:
      (a) identifying a date that the mailing job is to be executed and/or dispatched;
      (b) based on the corresponding mailing criteria and the identified date, retrieving:
         (1) a pallet scheme providing pallet location designations, the pallet scheme having an assigned effective date corresponding most closely to the date the mailing job is to be executed and/or dispatched, and
         (2) one or more mail sort schemes having an assigned effective date, corresponding most closely to the date the mailing job is to be executed and/or dispatched;
      (c) updating a pallet location designation associated with the one or more mail sort schemes as retrieved, based on the retrieved pallet scheme and the one or more retrieved mail sort schemes; and
      (d) enabling one or more of the sort schemes to be run on the mail processing device computer based on the mailing job to be processed;
   a tray tag printer for generating tray tags indicating an updated pallet location designation; and
   a plurality of mail trays for receiving the collected mail items each having affixed thereon a corresponding tray tag from the tray tag printer.

8. An article of manufacture, comprising:
   a machine readable storage medium; and
   programming instructions embodied in said medium for execution by at least one computer coupled for data communication with a mail processing device, wherein execution causes said at least one computer to perform functions comprising:
   (a) identifying a date that a mailing job is to be executed and/or dispatched;
   (b) based on mailing criteria corresponding to the mailing job and the identified date, retrieving:
      (1) a pallet scheme providing pallet location designations, the pallet scheme having an assigned effective date corresponding most closely to the date the mailing job is to be executed and/or dispatched, and
      (2) one or more mail sort schemes having an assigned effective date, corresponding most closely to the date the mailing job is to be executed and/or dispatched;
   (c) updating a pallet location designation associated with the one or more mail sort schemes as retrieved, based on the retrieved pallet scheme and the one or more retrieved mail sort schemes; and
   (d) enabling one or more of the sort schemes to be run on a mail processing device computer based on the mailing job to be processed on the mail processing device.

* * * * *